United States Patent
Wolff et al.

[11] Patent Number: 5,025,047
[45] Date of Patent: Jun. 18, 1991

[54] USE OF N,N'- AND N,N',N'-SUBSTITUTED SILYL UREAS AS ANTIDEGRADATION AGENTS AND POLYMER BLENDS WHICH CONTAIN THEM

[75] Inventors: Siegfried Wolff, Bornheim-Merten; Udo Goerl, Meckenheim, both of Fed. Rep. of Germany

[73] Assignee: Degussa Aktiengesellschaft, Frankfurt am Main, Fed. Rep. of Germany

[21] Appl. No.: 615,267

[22] Filed: Nov. 19, 1990

[30] Foreign Application Priority Data

Nov. 20, 1989 [DE] Fed. Rep. of Germany ....... 3938488

[51] Int. Cl.$^5$ ................................................. C08K 5/54
[52] U.S. Cl. ........................................ 524/99; 524/100; 524/188; 524/492; 524/495; 523/169; 523/213
[58] Field of Search ................. 524/188, 492, 495, 99, 524/100; 556/421; 523/213, 169

[56] References Cited

U.S. PATENT DOCUMENTS

| 3,576,033 | 4/1971 | Tesoro et al. | 556/421 |
| 3,595,830 | 7/1971 | Owen et al. | 524/188 |
| 3,647,742 | 3/1972 | Stevens | 523/213 |
| 3,808,172 | 4/1974 | Albarino et al. | 524/188 |
| 3,823,114 | 7/1974 | Albarino et al. | 524/188 |
| 3,895,043 | 7/1975 | Wagner et al. | 536/421 |
| 4,039,503 | 8/1977 | Itoh | 524/188 |
| 4,046,794 | 9/1977 | Pepe et al. | 556/421 |
| 4,141,751 | 2/1979 | Moreland | 106/447 |
| 4,151,154 | 4/1979 | Berger | 523/213 |
| 4,626,560 | 12/1986 | Marsden et al. | 523/213 |

FOREIGN PATENT DOCUMENTS

| 5772 | 12/1979 | European Pat. Off. . |
| 60-49032 | 3/1985 | Japan . |
| 01-101366 | 4/1989 | Japan . |
| 252607 | 9/1969 | U.S.S.R. . |
| 379580 | 5/1973 | U.S.S.R. . |
| 468942 | 4/1974 | U.S.S.R. . |
| 436836 | 7/1974 | U.S.S.R. . |
| 331692 | 11/1974 | U.S.S.R. . |
| 449080 | 11/1974 | U.S.S.R. . |
| 455131 | 12/1974 | U.S.S.R. . |
| 958459 | 9/1982 | U.S.S.R. . |

Primary Examiner—Veronica P. Hoke
Attorney, Agent, or Firm—Beveridge, DeGrandi & Weilacher

[57] ABSTRACT

The invention relates to N,N'- and N,N',N'-substituted silyl ureas of the general formula

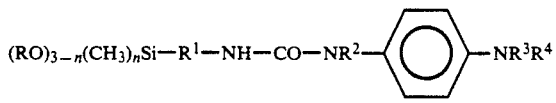

and to their use as antidegradation agents which can not be washed out in polymers, especially rubber.

16 Claims, No Drawings

USE OF N,N'- AND N,N',N'-SUBSTITUTED SILYL UREAS AS ANTIDEGRADATION AGENTS AND POLYMER BLENDS WHICH CONTAIN THEM

INTRODUCTION TO THE INVENTION

The present invention relates to the use of N,N'- and N,N',N'-substituted silyl ureas as antidegradation agents and polymer mixtures which contain them.

Customary commercial antidegradation agents which are used in the plastics industry and rubber processing industry are based as a rule on polyvalent aromatic amines of the following general formula:

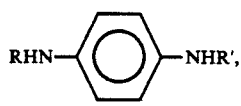

whereby it is known that the p-phenylene diamines are currently the most effective protecting agents against fatigue, heat aging and ozone influence. See G. P. Langner, Th. Kempermann, and O. Rosenthal, "Kautschuk und Gummi, Kunststoffe" 32, p. 81, 1979.

A basic disadvantage of these substances is based on the fact that the concentration of these protective substances decreases sharply during the processing and also in the use of the finished article because of their volatility, being dissolved out by water and solvent, and migration, so that an optimum long-time protection is not assured. See Th. Kempermann, W. Redetzky, and H. W. Engels, "Kautschuk und Gummi, Kunststoffe" 40, p. 1168, 1987; S. N. Charkravarty, S. K. Mastafi, R. M. Pandit, P. Svidhaven, and P. K. Pausare, "Kautschuk und Gummi, Kunststoffe" 36, p. 22, 1983.

In addition, there is the necessity of retaining antiaging substances in the vulcanizate for ecological reasons, thereby reducing any danger to the health of persons coming in contact with these polymerizates.

These reasons, taken together, have brought about an intensified search for years with the goal of retaining antidegradation agents in the polymerizate without reducing their effectiveness. Among other attempts, an elevation of the molecular weight and a binding of the antidegradation agents to the polymer chain or to a carrier substance were investigated as possibilities, which resulted, however, in a reduction of the protective action (B. T. Ashworth and P. Hill, Developments in Rubber Technology-1, Applied Science Publishers, London 1979, pp. 227-247).

SUMMARY OF THE INVENTION

It has now been found that N,N'- and N,N',N'-substituted silyl ureas of the general formula I:

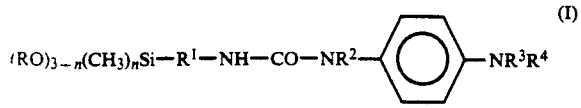

in which $n=0, 1$ or $2$; $R=C_1-C_6$ alkyl, linear or branched, phenyl, $C_5-C_8$ cycloalkyl; $R^1=-(CH_2)_3-$,

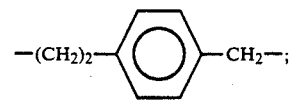

$R^2$, $R^3$, $R^4$ which may be the same or different=hydrogen, $C_1-C_{18}$ alkyl, linear or branched, $C_5-C_8$ cycloalkyl, $C_1-C_3$ alkyl, terminally substituted by an amino, thio or cyano group, $-(C_2H_4NH)_mH$ where $m=2$ or $3$, $C_3-C_{18}$ alkenyl, linear or branched, benzyl, phenyl, naphthyl, pyridyl, triazyl, optionally singly or multiply substituted by an amino, hydroxyl, thio, $C_1-C_4$-alkoxy, $C_1-C_4$-alkyl, -nitro or carboxyl group; in the presence of silicate or oxidic fillers and upon reaction of the compounds according to formula I via the trialkoxysilyl group(s) with the OH groups of the filler surface, are excellently suited as antidegradation agents in polymers. The agents are resistant to washing out.

DETAILED DESCRIPTION OF THE INVENTION

The compounds according to formula I are produced according to the method described in EP-PS 0 169 922 by first reacting a solution of a secondary or tertiary amino compound in an aprotic, polar, organic solvent with an equimolar amount of alkali cyanate and then allowing the mixture to react with an equimolar amount of a halogenosilane.

The term polymers denotes duroplasts such as e.g. phenol resins, polyester resins which are formed e.g. by means of the reaction of ethylene glycol, maleic acid or -anhydride with or without the addition of styrene, or epoxy resins, but also thermoplasts such as e.g. polyethylene, polypropylene, copolymers of ethylene and propylene, polyvinyl chloride, polyacrylonitrile and the like.

The compounds according to formula I are preferably used in the generally known rubber mixtures based on natural rubber (NR), isoprene rubber (IR), styrene-butadiene rubber (SBR), isobutylene-isoprene rubber (IIR), ethylene-propylene terpolymer (EPDM), nitrile rubber (NBR), halogen-containing rubbers and also epoxidized natural rubbers (ENR) as well as their blends.

In addition to the silicate and oxidic natural and synthetic fillers (e.g. clays, siliceous chalk, chalk, talkums, precipitated and pyrogenic silicas, aluminum oxide hydrates, calcium carbonate, etc.) which are necessary for a binding of the compound of the invention, the mixtures can additionally contain the rubber carbon blacks customarily used in the rubber industry.

The organosilicon compounds according to formula I are used either separately or already bound to filler. This can be either a simple mixture or a modified filler in which the reaction between the alkoxy groups of the organosilicon compound and the surface of the filler has already taken place prior to the addition to the rubber mixture.

Methods for modifying filler surfaces are generally known and can be carried out under the addition of organic solvents or water (DE-PS 34 37 473, DE-OS 27 43 633) or also in a solventless manner (U.S. Pat. No. 4,141,751, an English language equivalent of DE-OS 29 05 851).

The concentration of the organosilicon compound can be up to $3.5 \cdot 10^{-6}$ moles trialkoxysilyl groups per square meter filler surface.

The concentration of the organosilicon compounds should be adjusted in such a manner that it constitutes a total of 0.5 to 10 parts by weight, preferably 1.5 to 3 parts by weight, relative to 100 parts by weight of the polymeric portion.

In addition, the polymers contain the usual additives such as e.g. softeners, optionally other antidegradation agents, dyes, auxiliary processing agents and optionally other organosilicon compounds such as e.g. bis-(3-triethoxysilylpropyl) tetrasulfane, -γchloropropyltriethoxysilane, γ-mercaptopropyltrimethoxysilane, vinyltrialkoxysilanes, aminopropyltrialkoxysilanes and their blends in an amount of 0.1 to 20 parts by weight, preferably 1 to 10 parts by weight per 100 parts by weight filler.

The production of the polymer blends takes place in a known manner.

Rubber mixtures additionally contain:

customary vulcanization accelerators used in the rubber industry (e.g. sulfenamides, triazine accelerators, thiurams) alone or in a mixture in amounts of 0.1 to 10 parts by weight relative to 100 parts by weight rubber, vulcanization retarders such as e.g. Vulkalent E, PVI, likewise in amounts of 0.1 to 2 parts by weight relative to 100 parts by weight rubber, ZnO and stearic acid as promotors of the vulcanization in amounts of 0.5 to 10 parts by weight per 100 parts by weight rubber, additional conventional anti-aging, anti-ozone and anti-fatigue agents [anti-flex-cracking antioxidants] used in the rubber industry such as e.g. IPPD, TMQ as well as waxes as agents which protect against light, and their blends, any desired softeners such as e.g. aromatic, naphthenic, paraffinic, synthetic softeners and their blends, optionally sulfur in an amount of 0.1 to 10 parts by weight per 100 parts by weight rubber.

The production of the mixture takes place in a known manner in a single-stage or multi-stage method by first degrading the rubber or a rubber mixture to the desired viscosity in a closed mixer at a flowthrough temperature between 55° and 65° C. and subsequently mixing in the other mixing components such as e.g. fillers, the compounds of the invention, activators and softeners, but not accelerators and sulfur. The latter are subsequently added to the premixture either on the roller or in a kneader at low temperatures in order to avoid a premature scorching.

The area of application of the antidegradation agents which can not be washed out extends to rubber mixtures like those customarily used for tire manufacture and in the production of industrial articles such as e.g. mixtures for conveyor belts, V-belts, form articles, hoses with and without inserts, rubber roller coatings, jacketings, injection profiles, free-hand articles, foils, shoe soles and upper parts, cables, all-rubber tires and their vulcanizates.

A comparison of the anti-aging action of the compounds used in accordance with the invention with the compounds (e.g. Vulkanox® 4010 NA) frequently used today in the rubber industry as antidegradation agents shows that in the case of the polymeric blends of the invention, the protective action does not decline, even for anti-ozone protection.

The sharply reduced migration results in the possibility of compounding adjacent, different rubber mixtures like those found e.g. in all tires with the protecting agent which is the most suitable for the particular mixture without there being any danger that the protecting agents used for the different mixtures mix due to migration, thus reducing the optimum protection selected for the particular mixture.

The compounds used in accordance with the invention have the additional advantage that they bring about a distinct improvement of the rubber-technology property profile in comparison to the commercial anti-aging agents. Thus, their addition to the rubber mixture results in a distinct elevation of the cross-linking yield, which brings about an elevation of the modulus 300, of the tensile strength and of the Shore A hardness and, in addition, the scorching time is lengthened. All these improvements of quality have the result that other mixing components such as e.g. accelerators, sulfur and silanes can be dosed in in a lesser amount if necessary.

The following examples document the advantageous action of the compound used in accordance with the invention.

EXAMPLES

| Test norms for use: | | |
|---|---|---|
| | Testing method | Unit |
| Dmax-Dmin | DIN 53 529 | Nm |
| Scorch time | ASTM D 2084 | min |
| Mooney test | 53523/524 | ME (Mooney units) |
| Tensile strength, breaking elongation | DIN 53 504 | MPa |
| Tensile modulus (modulus 300) | | |
| Shore A hardness | DIN 53 505 | |
| Fatigue test (De Mattia) | ASTM D 813 | |

In order to prove that the compounds of the invention do not wash out, a dynamic ozone test was carried out at first by gassing the test specimens (dimensions analogous stat. ozone test according to DIN 53 509) at a temperature of 40° C., atmospheric humidity of 40% and a 20% dynamic expansion (frequency=0.5 Hz) with an ozone concentration of 200 pphm. The drop in strength in percent of the specimens was measured hereby after 25 h and 50 h. Subsequently, new test specimens but with the same mixing composition are stored 16 days in water at 40° C. and the drop in strength measured again after this time under the above conditions. The resulting drop in strength as a measure for the anti-ozone action before and after the storage in water is a parameter hereby for the capacity of the compounds according to formula I not to be washed out.

The following names and abbreviations are used in the examples of application, the significance of which is indicated in the following:

| | |
|---|---|
| SMR 5 | standard Malaysian rubber (natural rubber) |

-continued

| | |
|---|---|
| CORAX ® N 220 | carbon black, surface (BET) 120 m²/g (Degussa) |
| Ultrasil ® VN 3 | precipitated silica with a surface of 175 m²/g (Degussa) |
| Vulkanox ® 4010 NA | N-isopropyl-N'-phenyl-p-phenylene-diamine (IPPD) |
| Vulkanox ® 4030 | N,N'-bis-(1,4-dimethylpentyl)-p-phenyl diamine |
| Vulkacit ® MOZ | benzothiazyl-2-sulfene morpholide |
| TMQ | 2,2,4-trimethyl-1,2-dihydroquinoline |
| Vulkalent ® E | 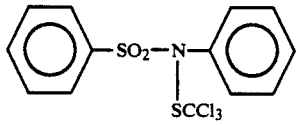 |
| PVI | N-(cyclohexylthio) phthalimide |
| SL 33-3-8 | 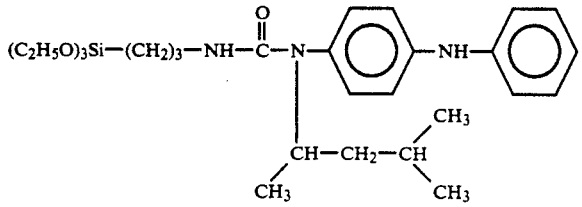 |
| SL 33-3-9 | 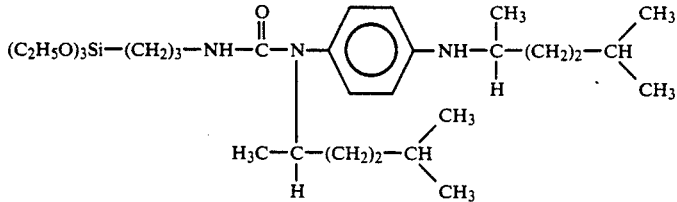 |
| SL 33-3-10 | 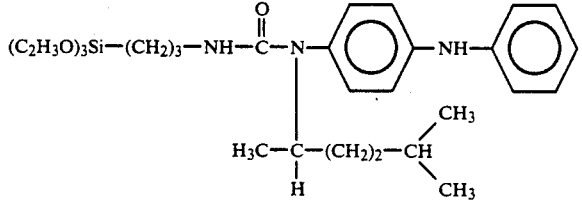 |
| SL 33-3-17 | 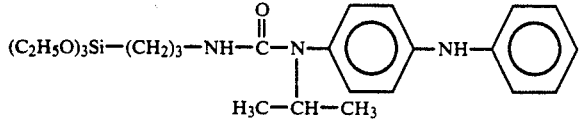 |

EXAMPLE 1

Comparison of the Rubber-Technology Property Profile and of the Anti-Ozone Action of Vulkanox 4030 and SL 33-3-9

| | | | | |
|---|---|---|---|---|
| SMR 5 | | 100 | 100 | 100 |
| CORAX N 220 | | 30 | 30 | 30 |
| Ultrasil VN 3 | | 20 | 20 | 20 |
| Zinc oxide | | 3 | 3 | 3 |
| Stearic acid | | 2 | 2 | 2 |
| Vulkanox 4030 NA | | — | 2.5 | — |
| SL 33-3-9 | | — | — | 2.5 |
| Vulkacit MOZ | | 1.5 | 1.5 | 1.5 |
| Sulfur | | 2 | 2 | 2 |
| ML (1 + 4) at 100° C. | | 110 | 114 | 104 |
| Vulcanization temperature 145° C. | | | | |
| Vulcanizate data at 145° C., t 95% | | | | |
| Dmax-Dmin | Nm | 6.31 | 6.43 | 7.89 |
| t 10% | min | 11.3 | 6.5 | 9.0 |
| Tensile strength | MPa | 16.3 | 16.5 | 20.9 |
| Modulus 300% | MPa | 8.0 | 7.8 | 9.6 |
| Shore A hardness | | 58 | 59 | 62 |
| Dynamic ozone test | | | | |
| Ozone concentration | 200 pphm | | | |
| Temperature: | 40° C. | | | |
| Atmospheric humidity: | 40% | | | |
| Expansion: | 20% (0.5 Hz) | | | |
| Before washing out | | | | |
| Drop in strength after 25 h | % | 18 | 8 | 10 |
| Drop in strength after 50 h | % | 26 | 14 | 15 |
| After washing out (16 days/40° C. H₂O) | | | | |
| Drop in strength after 25 h | % | 17 | 19 | 13 |
| Drop in strength after 50 h | % | 24 | 27 | 17 |

EXAMPLE 2

Comparison of the Rubber-Technology Property Profile and of the Anti-Ozone Action of Vulkanox 4010 NA and SL 33-3-17

| | | | |
|---|---|---|---|
| SMR 5 | 100 | 100 | 100 |
| CORAX N 220 | 30 | 30 | 30 |
| Ultrasil VN 3 | 20 | 20 | 20 |
| Zinc oxide | 3 | 3 | 3 |

| | | | |
|---|---|---|---|
| Stearic acid | | 2 | 2 | 2 |
| Vulkanox 4010 NA | | — | 2.5 | — |
| SL 33-3-17 | | — | — | 2.5 |
| Vulkacit MOZ | | 1.5 | 1.5 | 1.5 |
| Sulfur | | 2 | 2 | 2 |
| ML (1 + 4) at 100° C. | | 110 | 115 | 111 |
| Vulcanization temperature 145° C. | | | | |
| Vulcanizate data at 145° C., t 95% | | | | |
| Dmax-Dmin | Nm | 6.31 | 6.31 | 7.75 |
| t 10% | min | 11.3 | 7.7 | 10.0 |
| Tensile strength | MPa | 16.3 | 16.5 | 21.5 |
| Modulus 300% | MPa | 8.0 | 7.6 | 10.1 |
| Breaking elongation | % | 460 | 470 | 500 |
| Shore A hardness | | 58 | 58 | 63 |
| Dynamic ozone test | | | | |
| Ozone concentration | | 200 pphm | | |
| Temperature: | | 40° C. | | |
| Atmospheric humidity: | | 40% | | |
| Expansion: | | 20% (0.5 Hz) | | |
| Before washing out | | | | |
| Drop in strength after 25 h | % | 18 | 12 | 12 |
| Drop in strength after 50 h | % | 26 | 18 | 17 |
| After washing out (16 days/40° C. H2O) | | | | |
| Drop in strength after 25 h | % | 17 | 15 | 10 |
| Drop in strength after 50 h | % | 24 | 22 | 15 |

EXAMPLE 3

Comparison of the Rubber-Technology Property Profile and of the Anti-Aging Action of Vulkanox 4010 NA, SL 33-3-8 and SL 33-3-10

| | | | | | |
|---|---|---|---|---|---|
| SMR 5 | | 100 | 100 | 100 | 100 |
| CORAX N 220 | | 40 | 40 | 40 | 40 |
| Ultrasil VN 3 | | 10 | 10 | 10 | 10 |
| Zinc oxide | | 3 | 3 | 3 | 3 |
| Stearic acid | | 2 | 2 | 2 | 2 |
| Vulkanox 4010 NA | | — | 2.5 | — | — |
| SL 33-3-8 | | — | — | 2.5 | — |
| SL 33-3-10 | | — | — | — | 2.5 |
| Vulkacit MOZ | | 1.7 | 1.7 | 1.7 | 1.7 |
| Sulfur | | 1.8 | 1.8 | 1.8 | 1.8 |
| Vulcanization temperature 160° C. | | | | | |
| Vulcanizate data at 160° C., t 95% | | | | | |
| Dmax-Dmin | Nm | 9.88 | 9.00 | 9.83 | 9.68 |
| Tensile strength | MPa | 22.7 | 24.7 | 21.5 | 23.8 |
| Modulus 300% | MPA | 12.5 | 9.9 | 11.5 | 11.3 |
| Breaking elongation | % | 460 | 550 | 460 | 510 |
| Shore A hardness | % | 64 | 62 | 65 | 64 |
| Aging 3 days/100° C. (DIN 53 508) | | | | | |
| Drop in resistance to tearing | % | 44 | 31 | 14 | 15 |
| Breaking elongation | % | 56 | 43 | 40 | 40 |

EXAMPLE 4

Comparison of the Rubber-Technology Property Profile and of the Anti-Fatigue Action of SL 33-3-9 vis-te,gra/a/ -vis an unprotected specimen

| | | | |
|---|---|---|---|
| SMR 5 | | 100 | 100 |
| CORAX N 220 | | 40 | 40 |
| Ultrasil VN 3 | | 10 | 10 |
| Zinc oxide | | 3 | 3 |
| Stearic acid | | 2 | 2 |
| SL 33-3-9 | | — | 2.5 |
| Vulkacit MOZ | | 1.7 | 1.7 |
| Sulfur | | 1.8 | 1.8 |
| Vulcanization temperature 160° C. | | | |
| Vulcanizate data at 160° C., t 95% | | | |
| Dmax-Dmin | Nm | 9.88 | 9.62 |
| Modulus 300% | MPa | 12.5 | 11.6 |
| Shore A hardness | | 64 | 64 |

| | | |
|---|---|---|
| Fatigue test according to De Mattia (ASTM D 813) | | |
| Fissure growth according to kilocycles with puncture | | |
| 2-4 mm | 1.2 | 1.5 |
| 4-8 mm | 1.7 | 2.6 |
| 8-12 mm | 3.2 | 4.8 |
| Break | 12.4 | 21.9 |

Examples 1 and 2 show that the compounds of the invention are superior to the traditional anti-aging agents both as regards rubber engineering (higher cross-linking yield, longer scorch time, higher resistance to tearing, higher modulus 300% and higher Shore A hardness) and as regards their capacity not to be washed out.

Example 3 shows that the compounds of the invention also yield more advantageous values in hot-air aging in addition to the better rubber-technology property profile than commercial Vulkanox 4010 NA does.

Example 4 shows that the compounds of the invention yield a good fatigue protection in comparison to an unprotected specimen.

Further variations and modifications of the invention will become apparent to those skilled in the art from the foregoing and are intended to be encompassed by the claims appended hereto.

German Priority Application P 39 38 488.8 is relied on and incorporated by reference.

What is claimed:

1. A polymer blend comprising polymers and N,N'-and N,N',N'-substituted silyl ureas, as antidegradation agents in polymers, of the general formula I:

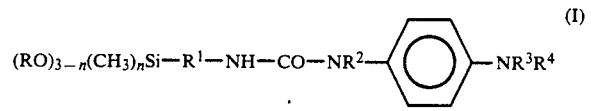

(I)

$(RO)_{3-n}(CH_3)_nSi-R^1-NH-CO-NR^2$—⟨phenyl⟩—$NR^3R^4$ wherein $n=0, 1$ or $2$, $R=C_1-C_6$ alkyl, linear or branched, phenyl, $C_5-C_8$ cycloalkyl, $R^1=-(CH_2)_3-$,

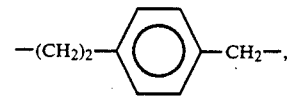

$-(CH_2)_2$—⟨phenyl⟩—$CH_2-$, $R^2$, $R^3$, $R^4$ which may be the same or different = hydrogen, $C_1-C_{18}$ alkyl, linear or branched, $C_5-C_8$ cycloalkyl, $C_1-C_3$ alkyl, terminally substituted by an amino, thio or cyano group, $-(C_2H_4NH)_mH$ where $m=2$ or $3$, $C_3-C_{18}$ alkenyl, linear or branched, benzyl, phenyl, naphthyl, pyridyl, triazyl, optionally singly or multiply substituted by an amino, hydroxyl, thio, $C_1-C_4$-alkyl, $C_1-C_4$-alkoxy, -nitro or carboxyl group.

2. The polymer blend according to claim 1, wherein said polymer contains silicate or oxidic fillers.

3. The polymer blend according to claim 1, further comprising carbon black and silicate filler.

4. The polymer blend according to claim 1, further comprising carbon black.

5. The polymer blend according to claim 1, wherein said silyl urea is bound to a filler.

6. The polymer blend according to claim 1, further comprising a filler.

7. The polymer blend according to claim 2, wherein the concentration of said silyl urea is up to $3.5 \cdot 10^{-6}$ moles trialkoxysilyl groups per square meter filler surface.

8. The polymer blend according to claim 1, wherein the concentration of said silyl urea constitutes 0.5 to 10 parts by weight relative to 100 parts by weight of the polymeric portion.

9. The polymer blend according to claim 8, wherein the concentration of said silyl urea constitutes 1.5 to 3 parts by weight relative to 100 parts by weight of the polymeric portion.

10. The polymer blend according to claim 1, wherein said polymer is a rubber.

11. The polymer blend according to claim 1, wherein said polymer is a duroplast or a thermoplast.

12. A tire comprising the polymer blend according to claim 1.

13. A hose comprising the polymer blend according to claim 1.

14. A belt comprising the polymer blend according to claim 1.

15. A method for producing the polymer blend according to claim 1, comprising adding said silyl urea in a mixture with carbon black or silica directly to said polymer.

16. A method for producing the polymer blend according to claim 1, comprising adding a reaction product between said silyl urea and carbon black or silica directly to said polymer.

* * * * *